(12) United States Patent
Hari (10) Patent No.: US 10,756,635 B2
(45) Date of Patent: Aug. 25, 2020

(54) METHODS AND SYSTEMS OF PEAK PRIMARY CURRENT CONTROL ON THE SECONDARY SIDE

(71) Applicant: SEMICONDUCTOR COMPONENTS INDUSTRIES, LLC, Phoenix, AZ (US)

(72) Inventor: Ajay Karthik Hari, Scottsdale, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/032,323

(22) Filed: Jul. 11, 2018

(65) Prior Publication Data

US 2020/0021197 A1    Jan. 16, 2020

(51) Int. Cl.
*H02M 3/335* (2006.01)
*H02M 3/337* (2006.01)
*H02M 1/00* (2006.01)

(52) U.S. Cl.
CPC ...... *H02M 3/33523* (2013.01); *H02M 3/3376* (2013.01); *H02M 2001/0009* (2013.01)

(58) Field of Classification Search
CPC ............... H02M 3/335–42; H02M 2001/0009
See application file for complete search history.

(56) References Cited

U.S. PATENT DOCUMENTS

| 5,745,359 A * | 4/1998 | Faulk ............... H02M 3/33523 363/21.13 |
| 7,045,993 B1 | 5/2006 | Tomiyoshi |
| 7,558,093 B1 | 7/2009 | Zheng |
| 2015/0381065 A1 * | 12/2015 | Yonezawa ........... H02M 3/3378 363/25 |
| 2017/0155335 A1 * | 6/2017 | Chang .................... H02M 1/08 |
| 2018/0262096 A1 * | 9/2018 | Hsu ......................... H02M 1/08 |

* cited by examiner

*Primary Examiner* — Thienvu V Tran
*Assistant Examiner* — Peter M Novak
(74) *Attorney, Agent, or Firm* — Dickinson Wright PLLC; Mark E. Scott (57) ABSTRACT

Peak primary current control on the secondary side. In a power converter having a primary side and a secondary side separated by a main transformer, example methods include: driving primary current through a primary winding of the main transformer; creating, on the secondary side of the main transformer, a signal indicative of current through the primary winding of the main transformer; and ceasing the driving of primary current through the primary winding when the signal indicative of primary current reaches a predetermined value.

23 Claims, 6 Drawing Sheets

METHODS AND SYSTEMS OF PEAK PRIMARY CURRENT CONTROL ON THE SECONDARY SIDE

CROSS-REFERENCE TO RELATED APPLICATIONS

Not Applicable.

BACKGROUND

Switching power converters implement a primary-side controller that controls the duty cycle of the pulse-width modulation (PWM) signal applied to the gate of the main field effect transistor (FET). In many cases, the feedback parameter for the control loop is a signal indicative of output voltage provided from the secondary side by way of an optocoupler having its light emitting diode (LED) operatively coupled to the output voltage of the power converter, and its optically driven transistor coupled to provide the signal indicative of output voltage to the primary-side controller.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, individual circuit components on a substrate, an application specific integrated circuit (ASIC) constructed on a substrate, a microcontroller constructed on a substrate (with controlling software stored on or off the substrate), or combinations thereof configured to read signals and take action responsive to such signals.

In relation to electrical devices (e.g., on a substrate), the terms "input" and "output" refer to electrical connections to the electrical devices, and shall not be read as verbs requiring action. For example, a controller may have a gate output and one or more sense inputs.

Reference to an action taking place "on the secondary side" of a transformer shall mean that the electrical signals are created or modified with energy derived from the secondary winding of a main transformer. Thus, "on the secondary side" is in some cases a spatial constraint (because in many cases an action taking place "on the secondary side" will physically be on the secondary side), and "on the secondary side" is an electrical constraint.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The duty cycle of a pulse-width modulation (PWM) signal applied to the gate of the main FET controls the peak current that is developed through the primary winding in each switching cycle. In critical conduction mode (CrM) and discontinuous conduction mode (DCM) the peak current through the primary winding is the controlled variable in the control loop (i.e., peak current control). That is, the control loop modulates the set point for peak current in each switching cycle, with lower set points for peak current resulting in a shorter duty cycle of the PWM signals, and higher set points for peak current resulting in a longer duty cycle.

For transient loading and adjustable loading scenarios (Universal Serial Bus (USB) Power Delivery (PD) modes of operation), reaction time of the primary-side controller can be too slow to ensure the output voltage remains within acceptable limits. Further, controlling secondary side switch (synchronous rectifier (SR)) from the secondary without any information about main power switch's duty cycle and frequency is unreliable. It often results in shoot through or premature turn-off of the SR switch.

Various example embodiments are directed to switching power converters that implement peak primary current control on the secondary side switching power converter. More particularly, in example embodiments the secondary-side controller implements peak current mode control of current through the primary winding when the main field effect transistor (FET) is conductive. However, because the peak current mode control is implemented on the secondary side, the secondary-side controller emulates the primary current. More particularly still, in example embodiments the pulse-width modulation (PWM) signal driven to the gate of the main FET is initially created by the secondary-side controller and transferred to the primary side by way of a system that provides galvanic isolation. The secondary-side controller commands the primary-side controller to make the primary FET conductive, which causes current flow through the primary winding of the main transformer. The secondary-side controller also creates a signal indicative of primary current, and when the signal indicative of primary current reaches a predetermined value, the secondary-side controller commands the primary-side controller to make the primary FET non-conductive. Having the secondary-side controller be responsible for creating the primary PWM signal makes the overall switching power converter more responsive to load transients and changes to output voltage (e.g., caused by implementing multiple power delivery modes). The specification now turns to an example switching power converter to orient the reader, as well as to provide a mathematical basis for emulating the primary current on the secondary side of the power converter.

Figure 1:
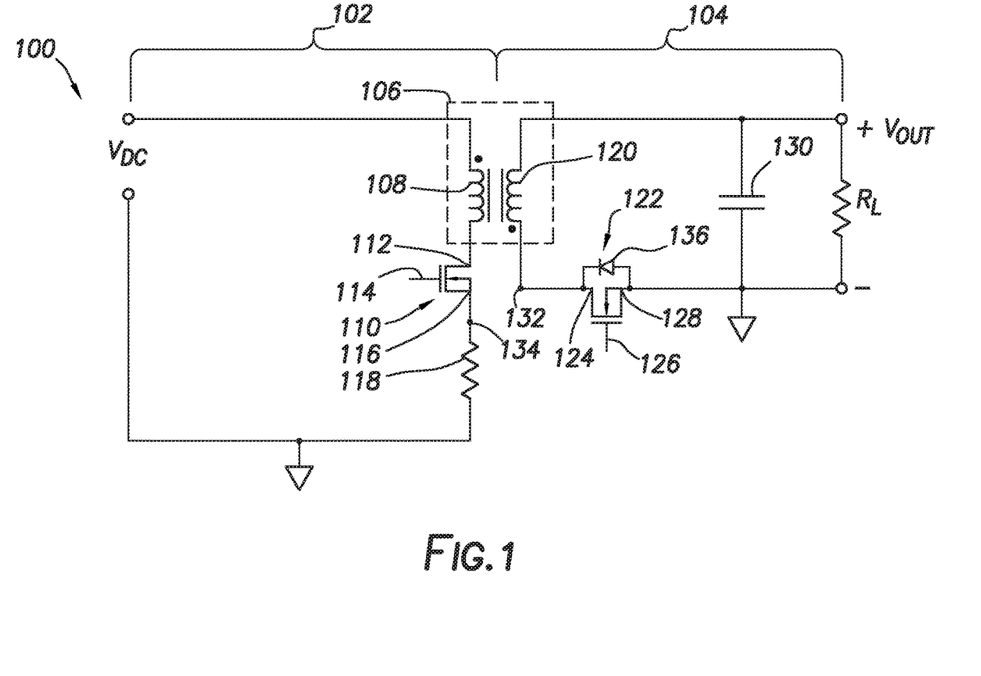
FIG. 1 shows a schematic diagram of a switching power converter in accordance with at least some embodiments.

FIG. 1 shows a schematic diagram of a switching power converter 100 (hereafter just "power converter 100") in accordance with at least some embodiments. In particular, the power converter 100 comprises a primary side 102 galvanically isolated from a secondary side 104 by way of a main transformer 106. A direct current (DC) supply voltage $V_{DC}$ is supplied to the power converter 100. The power converter creates a DC output voltage $V_{OUT}$ provided to a load (the load illustratively shown as load resistor $R_L$). The primary side 102 comprises a primary winding 108 of the main transformer 106. A first lead or connection of the primary winding 108 is coupled to the positive side of the supply voltage $V_{DC}$. The second lead or connection of the primary winding 108 couples a main FET 110. In particular, the main FET 110 defines a drain 112, a gate 114, and a source 116. The drain 112 couples to the second connection of the primary winding 108. The source 116 couples to an example sense resistor 118, and the second side of the sense resistor couples to ground. The gate 114 couples to a primary-side controller (not shown in FIG. 1).

On the secondary side 104, the example power converter 100 comprises a secondary winding 120 of the main transformer 106. A first lead or connection of the secondary winding 120 couples to the positive terminal of the output voltage $V_{OUT}$, and the second lead or connection couples to a secondary FET 122. The secondary FET 122 defines a drain 124, a gate 126, and a source 128. The drain 124 couples to the second connection of the secondary winding 120. The source couples ground or common on the secondary side 104. The gate couples to a secondary-side controller (not shown in FIG. 1). The secondary FET 122 may include a body diode 136 between the drain 124 and the source 128. The secondary side 104 further comprises smoothing capacitor 130 coupled between the positive terminal of the output voltage $V_{OUT}$ and the negative terminal of the output voltage $V_{OUT}$ (i.e., ground or common on the secondary side). In some embodiments, it may also include a LC filter post capacitor 130 to either further reduce the ripple or in some cases create a secondary resonant circuit for wave-shaping.

In operation, the example power converter 100 works by transferring energy across the main transformer 106 by making the main FET 110 conductive and then non-conductive. That is, when the main FET 110 is conductive, electrical current builds through the primary winding 108, flowing from the voltage source $V_{DC}$, through the primary winding 108, through the main FET 110, and through the sense resistor 118 to ground. Once the current flow reaches a predetermined value (hereafter "peak current"), the main FET 110 is made non-conductive. Additional clamping circuits may be implemented on the primary side 102, but are not shown so as not to unduly complicate the figure. The peak current value is set based on a variety of factors, such as the desired output voltage $V_{OUT}$ and the electrical current being provided to the load.

During periods of time when the main FET is conducting, a voltage is induced on the secondary winding 120 with a polarity as shown by the dot convention in FIG. 1. The polarity tends to make the voltage across the secondary FET 122 higher on the drain 124 side, but during periods of time when the main FET 110 is conducting the secondary FET 122 in a non-conductive state, and no current flows through the secondary winding 120. Thus, energy is stored in the field of the main transformer 106 during periods of time when the main FET 110 is conducting. Again, once the current flow through the primary winding 108 reaches the peak current, the main FET 110 is made non-conductive. Once the main FET 110 is made non-conductive, the voltage induced on the secondary winding reverses, the secondary FET 122 is made conductive, and the collapsing field produces current flow in the secondary winding 120 that supplies the load $R_L$ and stores charge in the capacitor 130. Thus, the example power converter 100 shown is arranged for flyback operation.

In related art power converters that implement peak current control, the current through the primary winding 108 may be sensed by way of sensing the voltage at current sense node 134 between the source 116 of the main FET 110 and the sense resistor 118. More particularly, in related art power converters a primary-side controller (not shown in FIG. 1) senses primary current (by way of sense resistor 118), and makes the main FET non-conductive in each cycle when a set point for peak current is reached. For steady-state operation, having the primary-side controller implement peak current control may work suitably well. However, for transient loading and adjustable loading scenarios (Universal Serial Bus (USB) Power Delivery (PD) modes of operation), reaction time of the primary-side controller can be too slow to ensure the output voltage remains within acceptable limits. In example embodiments, rather than measure primary current on the primary side 102, the example embodiments model or emulate primary current on the secondary side 104 to create a signal indicative of primary current. The secondary-side controller (not shown in FIG. 1) creates a primary PWM signal that is provided to the primary side (and thus to the gate 114 of the main FET 110). The secondary-side controller de-asserts the primary PWM signal when the signal indicative of primary current reaches a predetermined value. Stated otherwise, the example systems implement primary current control, but the implementation is provided on the secondary side 104 with the primary PWM signals created on the secondary side 104 and sent across to the primary side 102. The specification now turns to an example mathematical basis for emulating the primary current on the secondary side 104.

Still referring to FIG. 1, on the primary side 102 during periods of time when the main FET 110 is conducting, the peak voltage at the current sense node 134 may be calculated based on the following equation:

$$V_{CS} = \frac{V_{DC} \cdot T_{ON}}{L} \cdot R_{CS} \qquad (1)$$

where $V_{CS}$ is the voltage at the current sense node 134, $V_{DC}$ is the source voltage, $T_{ON}$ is the on time of the main FET 110 in a switching cycle, L is the magnetizing inductance of the primary winding 108, and $R_{CS}$ is the resistance of the sense resistor 118. On the secondary side 104, during the period of time that the secondary FET 122 is non-conductive (e.g., when the main FET 110 is conductive), the voltage at the node 132 between the secondary winding 120 and the secondary FET 122 may be calculated by the following equation:

$$V_S = \frac{V_{DC}}{N} + V_{OUT} \qquad (2)$$

where $V_S$ is the voltage at the node 132, N is the turns ratio of the main transformer, and the remaining parameters are as defined above.

Figure 2:
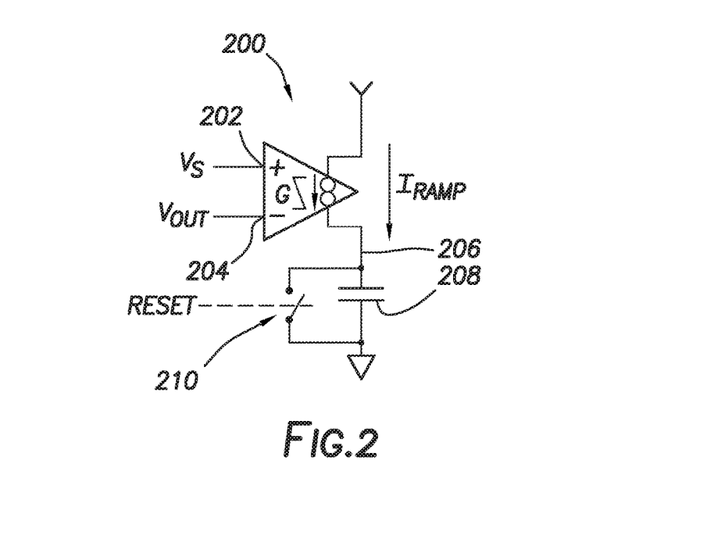
FIG. 2 shows an emulation circuit in accordance with at least some embodiments.

In example embodiments a signal indicative of primary current is created on the secondary side of the main transformer. The available parameters with which to emulate the primary current are the output voltage $V_{OUT}$ and the voltage $V_S$ at the node 132. FIG. 2 shows an emulation circuit in accordance with at least some embodiments. In particular, FIG. 2 shows a transconductance amplifier 200 (hereafter just "amplifier 200") defining a non-inverting input 202, an inverting input 204, and a current output 206. The non-inverting input 202 is coupled to the voltage $V_S$ at node 132, and the inverting input 204 is coupled to the output voltage $V_{OUT}$. The amplifier has a gain G and creates a ramp current $I_{RAMP}$ based on the differential voltage at the inputs and the gain G. In the example system shown, the current output 206 (driving the $I_{RAMP}$) feeds a capacitor 208. The $I_{RAMP}$ current may be as shown by the following equation:

$$I_{RAMP} = (V_S - V_{OUT}) \cdot G \qquad (3)$$

where $I_{RAMP}$ is ramp current, G is the gain of the amplifier 200, and the remaining parameters are as described above. Substituting $V_S$ from equation (2) into equation (3) yields:

$$I_{RAMP} = \frac{V_{DC}}{N} \cdot G \qquad (4)$$

Assuming the voltage on capacitor 208 starts at zero for each cycle (as caused by switch 210 at least momentarily closing), the voltage on the capacitor may be shown by the following equation:

$$V_C = \frac{I_{RAMP} \cdot T_{ON}}{C} \qquad (5)$$

where $V_C$ is the voltage on capacitor C 208. Substituting $I_{RAMP}$ from equation (4) into equation (5) yields:

$$V_C = \frac{V_{DC} \cdot G \cdot T_{ON}}{N \cdot C} \qquad (6)$$

Now, if the voltage on the capacitor C 208 is selected to emulate the voltage $V_{CS}$ at the current sense node 134 (i.e. $V_S$ equals $V_{CS}$), then setting equation (1) equal to equation (6) and solving for C yields:

$$C = \frac{L \cdot G}{N \cdot R_{cs}}. \qquad (7)$$

In other words, a capacitance can be selected to model or emulate the magnetizing inductance, and the selection of capacitance is independent of the source voltage $V_{DC}$, the output voltage $V_{OUT}$, and the on time $T_{ON}$. Stated otherwise, a single value of capacitance in the example circuit of FIG. 2 may be calculated and selected, and operation remains valid regardless of changes in source voltage $V_{DC}$, output voltage $V_{OUT}$, and the on time $T_{ON}$ (related to duty cycle of the primary PWM signal).

Figure 3:
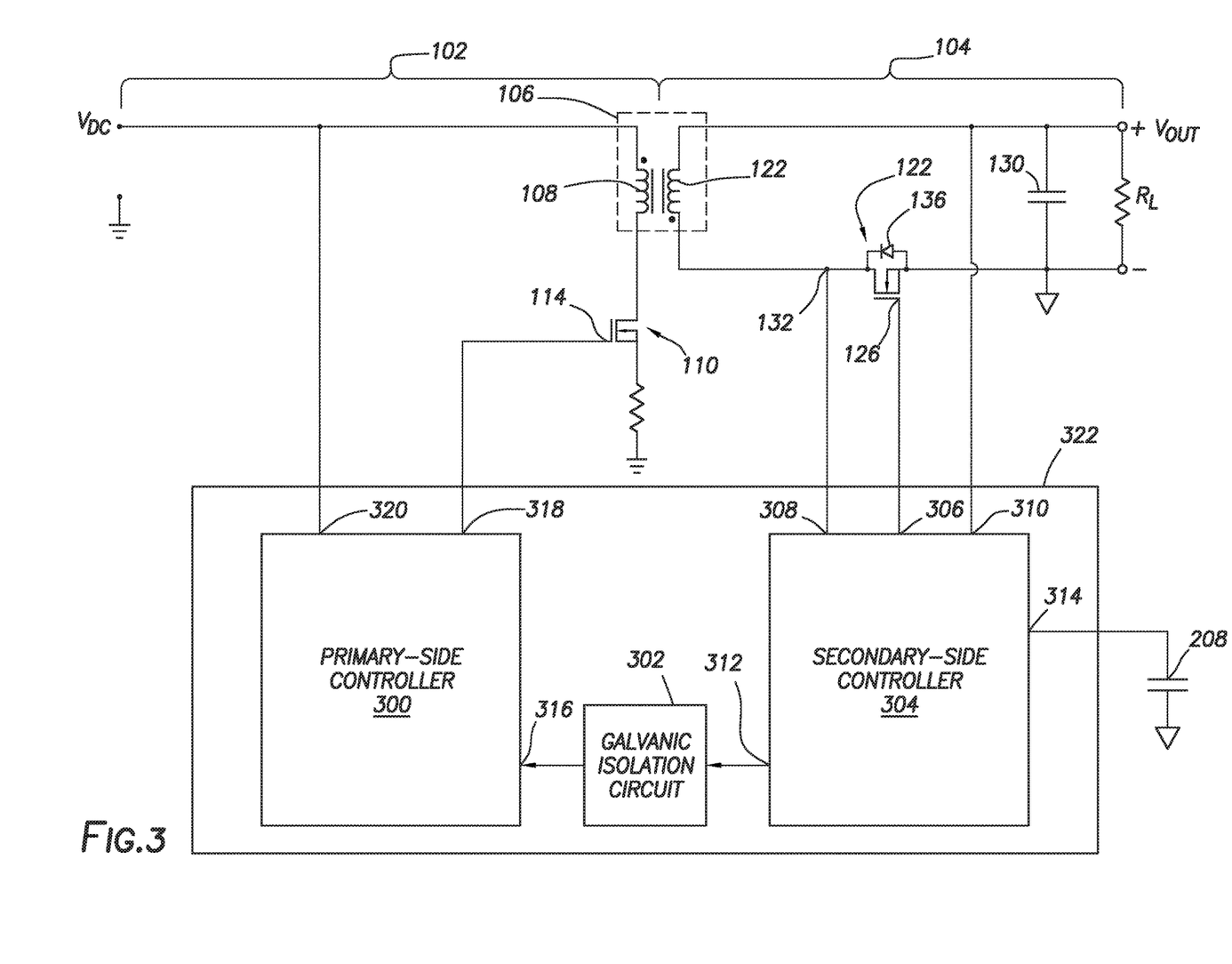
FIG. 3 shows a switching power converter in accordance with at least some embodiments.

FIG. 3 shows a power converter in accordance with at least some embodiments. In particular, FIG. 3 shows all the components of power converter 100 as shown in FIG. 1, and further includes a primary-side controller 300, a galvanic isolation circuit 302 (hereafter just "isolation circuit 302"), and a secondary-side controller 304. The secondary-side controller 304 defines a gate terminal 306, a winding sense terminal 308, an output voltage terminal 310, a primary PWM terminal 312, and an external capacitor terminal 314. Additional terminals would also be present (e.g., ground terminal), but those additional terminals are not shown so as not to unduly complicate the figure. The gate terminal 306 couples to the gate of the secondary FET 122, and thus the secondary-side controller 304 makes the secondary FET 122 conductive and non-conductive by appropriately driving a gate signal to the gate 126 of the secondary FET 122. The winding sense terminal 308 couples to the node 132 (and thus couples to the $V_S$ discussed above). The output voltage terminal 310 couples to the output voltage $V_{OUT}$. As shown, the secondary-side controller 304 is directly coupled to the output voltage $V_{OUT}$ for sensing purposes, but coupling through a voltage divider circuit to reduce the voltage (if needed) is also contemplated. The primary PWM terminal 312 couples to the primary-side controller 300 by way of isolation circuit 302, where the isolation circuit 302 provides galvanic isolation between the primary side 102 and the secondary side 104. The secondary-side controller 304 sends a primary PWM signal to the primary-side controller 300 by way of the isolation circuit 302. The external capacitor terminal 314 couples to capacitor 208 selected to emulate primary current as discussed above (and as discussed more below).

The primary-side controller 300 defines a pulse input 316, a gate output 318, and a voltage sense input 320. The pulse input 316 is coupled to the isolation circuit 302 to receive the primary PWM signal from the secondary-side controller 304. The gate output 318 is coupled to the gate 114 of the main FET 110. The voltage sense input 320 is coupled to the source voltage $V_{DC}$. Additional terminals would also be present (e.g., ground terminal), but those additional terminals are not shown so as not to unduly complicate the figure. The specification now turns to an explanation of an example startup situation, followed by non-startup operation, of the power converter 100.

Consider initially that the power converter 100 is powered off (i.e., no source voltage $V_{DC}$ is provided). When source voltage $V_{DC}$ is initially provided but before there have been any switching cycles of the main FET 110, no power has been transferred to the secondary side 104 to operate the secondary-side controller 304, and thus the secondary-side controller 304 remains powered off. Given that the secondary-side controller 304 is powered off, the secondary-side controller 304 will be unable to generate and provide the primary PWM signal to the primary-side controller 300. Thus, during initial startup of the power converter 100 (i.e., when the source voltage $V_{DC}$ is initially applied to the primary-side controller 300), the primary-side controller 300 creates and drives a gate signal on the gate output 318 in the absence of a primary PWM signal supplied to the pulse input 316. Driving a gate signal by the primary-side controller 300 may be at a predetermined frequency and duty cycle to charge capacitor 130 (or a peak charge capacitor on a secondary auxiliary winding) on the secondary side 104 to power the secondary-side controller 304. Once the secondary-side controller 304 is powered (i.e., non-startup operation), the secondary-side controller 304 sends the primary PWM signal across the isolation circuit 302 to the pulse input 316, and the primary-side controller 300 asserts and de-asserts the gate output 318 responsive to assertion and de-assertion, respectively, of the primary PWM signal on the gate input 316.

During non-startup operation, and considered from the perspective of the secondary-side controller 304, the secondary-side controller 304 is configured to command the primary-side controller 300 to make the main FET 110 conductive to induce a primary current through the primary winding 108. In the example embodiments, the command is issued by way of the primary PWM terminal 312 through the isolation circuit 302. Responsive to the command, the primary-side controller 300 asserts the gate output 318 to the gate 114 of the main FET 110. Contemporaneously with the command to make the main FET 110 conductive, the secondary-side controller 304 creates the signal indicative of primary current. In the example system, the signal indicative of primary current is a voltage at the external capacitor terminal 314 caused by current driven to the capacitor 208 (with the capacitor 208 selected as discussed above) to model or emulate the primary current. When the signal indicative of the primary current reaches or exceeds a predetermined value (peak current), the secondary-side controller 304 then commands the primary-side controller 300 to make the main FET 110 non-conductive, the command by way of the primary PWM terminal 312 through the isolation circuit 302 and to the pulse input 316. Responsive to the command to make the main FET 110 non-conductive, the primary-side controller 300 de-asserts the gate output 318 to the gate 114 of the main FET 110. Thus, the secondary-side controller 304 effectively creates and controls each switching cycle of the main FET 110 by selective assertion and de-assertion of the primary PWM signal applied to the primary PWM terminal 312. Stated otherwise, for each switching cycle of the main FET 110, the secondary-side controller 304 commands the main FET 110 to become conductive, creates a signal indicative of primary current on the secondary side, and when the signal indicative of primary current reaches the predetermined value, commands the main FET 110 to become non-conductive.

Still referring to FIG. 3, the isolation circuit 302 may take any suitable form. In some cases the isolation circuit is a gate-drive transformer distinct from the main transformer 106, where the communication transformer has a primary winding (on the secondary side 104) and a secondary winding (on the primary side 102). The secondary-side controller 304 may thus drive the primary PWM signal to the primary winding, and the secondary winding may provide the PWM signal to the pulse input 316 of the primary-side controller 300. In yet still other embodiments, the isolation circuit 302 may take the form of an optocoupler or galvanic isolator built on silicon either using inductive or capacitive coupling. That is, the optocoupler may define an optical diode coupled to the primary PWM terminal 312. The optocoupler may define a transistor whose base region is optically driven by light from the diode, with the transistor coupled to the pulse input 316 of the primary-side controller 300.

Figure 4:
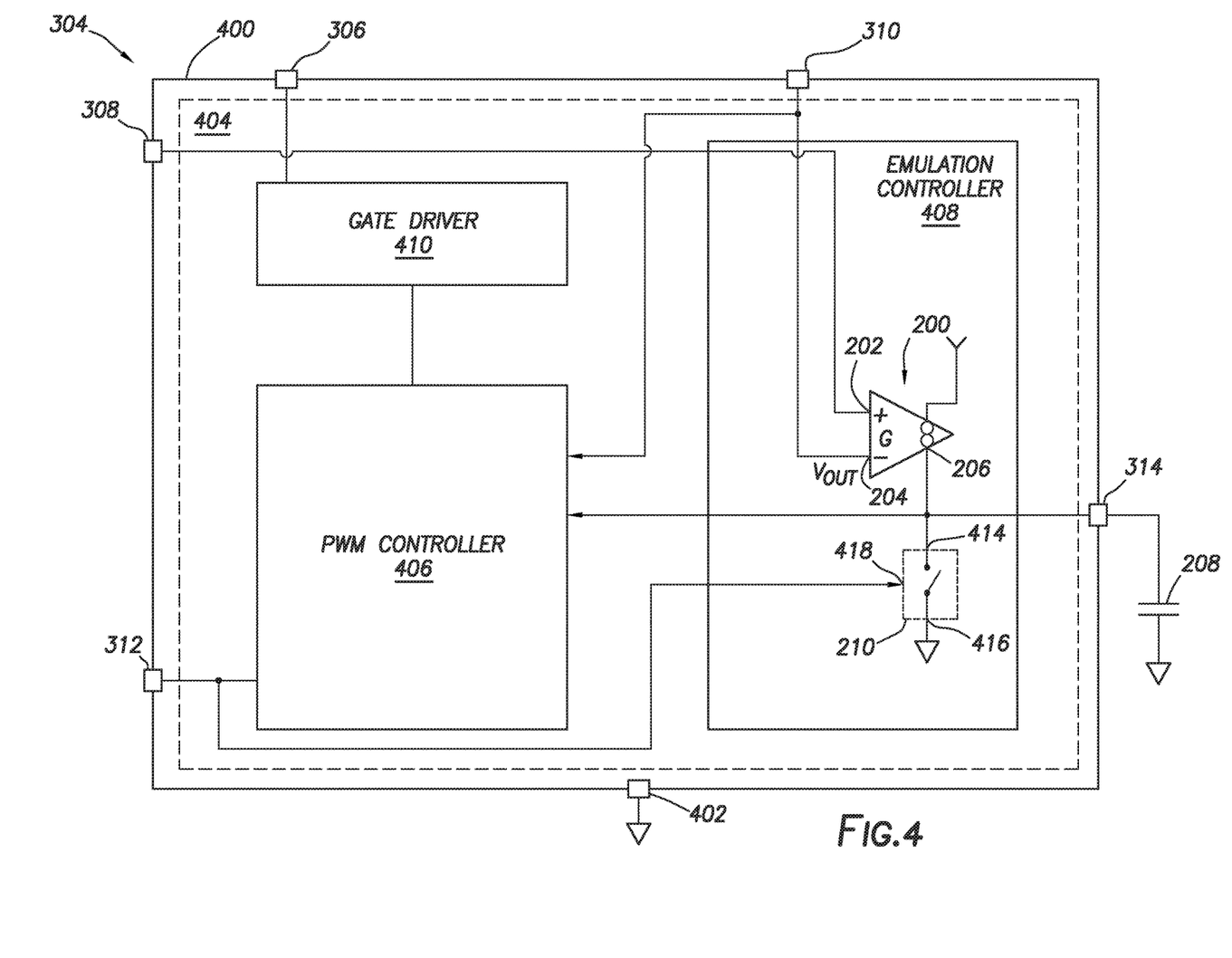
FIG. 4 shows a block diagram of a secondary-side controller in accordance with at least some embodiments.

FIG. 4 shows a block diagram of a secondary-side controller in accordance with at least some embodiments. In particular, FIG. 4 shows an example secondary-side controller 304 in the form of a packaged integrated circuit 400. The packaged integrated circuit 400 may take any suitable form (e.g., dual inline package (DIP), surface mount, etc.). Regardless of the package form, a plurality of terminals of the packaged integrated circuit 400 are electrically accessible, such as gate terminal 306, winding sense terminal 308, output voltage terminal 310, primary PWM terminal 312, external capacitor terminal 314, and ground or common terminal 402. Other terminals are likewise present, but again are not shown so as not to unduly complicate the figure. The terminals are electrically coupled in any suitable form to various electronic devices monolithically constructed on a substrate 404 (the substrate shown in dashed lines) of semiconductor material (e.g., silicon).

In particular, the example secondary-side controller 304 may comprise a PWM controller 406 defined on the substrate 404. The PWM controller 406 is electrically coupled to the output voltage (by way of the output voltage terminal 310) and electrically coupled to the primary PWM terminal 312. The example secondary-side controller 304 may further comprise an emulation controller 408 defined on the substrate 404. The emulation controller 408 electrically couples to the winding sense terminal 308, the output voltage terminal 310, and the external capacitor terminal 314. Finally, the example secondary-side controller 304 may comprise a gate driver 410 coupled to the gate terminal 306. The secondary-side controller 304 may derive power from the output voltage $V_{OUT}$ by way of the output voltage terminal 310 (or a separate power terminal), but the circuitry used to power the secondary-side controller 304 is not shown so as not to unduly complicate the figure. The example secondary-side controller 304 uses an internal ground or common by way of the common terminal 402 (shown coupled to a common connection), but again the distribution of the ground or common throughout the secondary-side controller 304 is not shown so as not to unduly complicate the figure.

As the name may imply, the gate driver 410 is designed and constructed to drive the gate 126 (FIG. 3) of the secondary FET 122 (FIG. 3) with proper voltages to make the secondary FET 122 (FIG. 3) conductive and non-conductive as part of synchronous operation of the secondary side 104 (FIG. 3) of the power converter 100 (FIG. 3). The gate signal at the gate terminal 306 is asserted, and thus the secondary FET 122 is conductive, during periods of time when the main FET 110 is non-conductive and the secondary winding 120 (FIG. 3) is providing current to the capacitor 130 (FIG. 3). Oppositely, the gate signal at the gate terminal 306 is de-asserted, and thus the secondary FET 122 is non-conductive, during periods of time when the main FET 110 is conductive as part of the switching cycle on the primary side 102 (FIG. 3). In at least some embodiments the secondary-side controller 304 asserts the gate signal on the gate terminal 306 when the secondary-side controller 304 senses that the body diode 136 is forward biased.

The example PWM controller 406 is designed and constructed to create the primary PWM signal driven to the primary PWM terminal 312. In particular, the PWM controller 406 is coupled to the signal indicative of primary current (i.e., the voltage at external capacitor terminal 314), and the PWM controller 406 is configured to control duty cycle of the primary PWM signal based on the signal indicative of primary current and the sensed output voltage.

Still referring to FIG. 4, the emulation controller 408 is designed and constructed to create the signal indicative of primary current by driving current to the external capacitor terminal 314 (and as shown the capacitor 208), where the external capacitor 208 may be selected as described above. Though the emulation controller 408 can take many suitable forms, in the example system of FIG. 4 the emulation controller 408 implements the amplifier 200 (e.g., a differential input current amplifier) and the switch 210 (e.g., an electrically controlled switch) discussed with respect to FIG. 2. In particular, the non-inverting input 202 is coupled to the winding sense terminal 308 (and thus the node 132 (FIG. 2)) which supplies $V_S$ discussed above. The inverting input 204 is coupled to the output voltage terminal 310 (and thus the output voltage $V_{OUT}$ (FIG. 2)). The current output 206 of the amplifier 200 couples to the external capacitor terminal 314 (and thus to external capacitor 208). The current output 206 also couples to the switch 210. In particular, switch 210 defines a first connection 414, a second connection 416, and a control input 418. The first connection 414 couples to the current output 206, and the control input 418 couples to the PWM signal driven to the primary PWM terminal 312. The second connection 416 of switch 210 couples to common. In operation then, when the primary PWM signal is de-asserted, the switch 210 closes thus discharging the voltage on capacitor 208. When the PWM signal is asserted, switch 210 opens enabling the current flow created by the amplifier 200 to charge the capacitor 208 over time and thus create the signal indicative of primary current. When the signal indicative of primary current reaches a predetermined value (as set and monitored by the PWM controller 406), the primary PWM signal goes de-asserted again and in the example embodiments the process begins anew.

The various embodiments that implement modeling or emulating primary current on the secondary side 104 of the power converter may operate in many operational modes regarding current through the primary winding 108. For example, the secondary-side controller 304 may implement a discontinuous conduction mode of the primary winding 108. That is, in each switching cycle the field associated with the transformer may fully collapse and thus current through primary winding may fall to zero for a non-zero period of time before the next charging cycle where the main FET 110 becomes conductive. In other cases, the secondary-side controller 304 may implement a continuous conduction mode of the primary winding 108. That is, in each switching cycle the field associated with the transformer may only partially collapse and thus current through the primary winding 108 is still flowing when the next charging cycle (where the main FET 110 becomes conductive) begins. In yet still other cases, the secondary-side controller 304 may implement a critical conduction mode of the primary winding 108. That is, in each switching cycle the next charging cycle (where the main FET 110 becomes conductive) begins or is triggered by the current in the primary winding 108 reaching zero.

Figure 5:
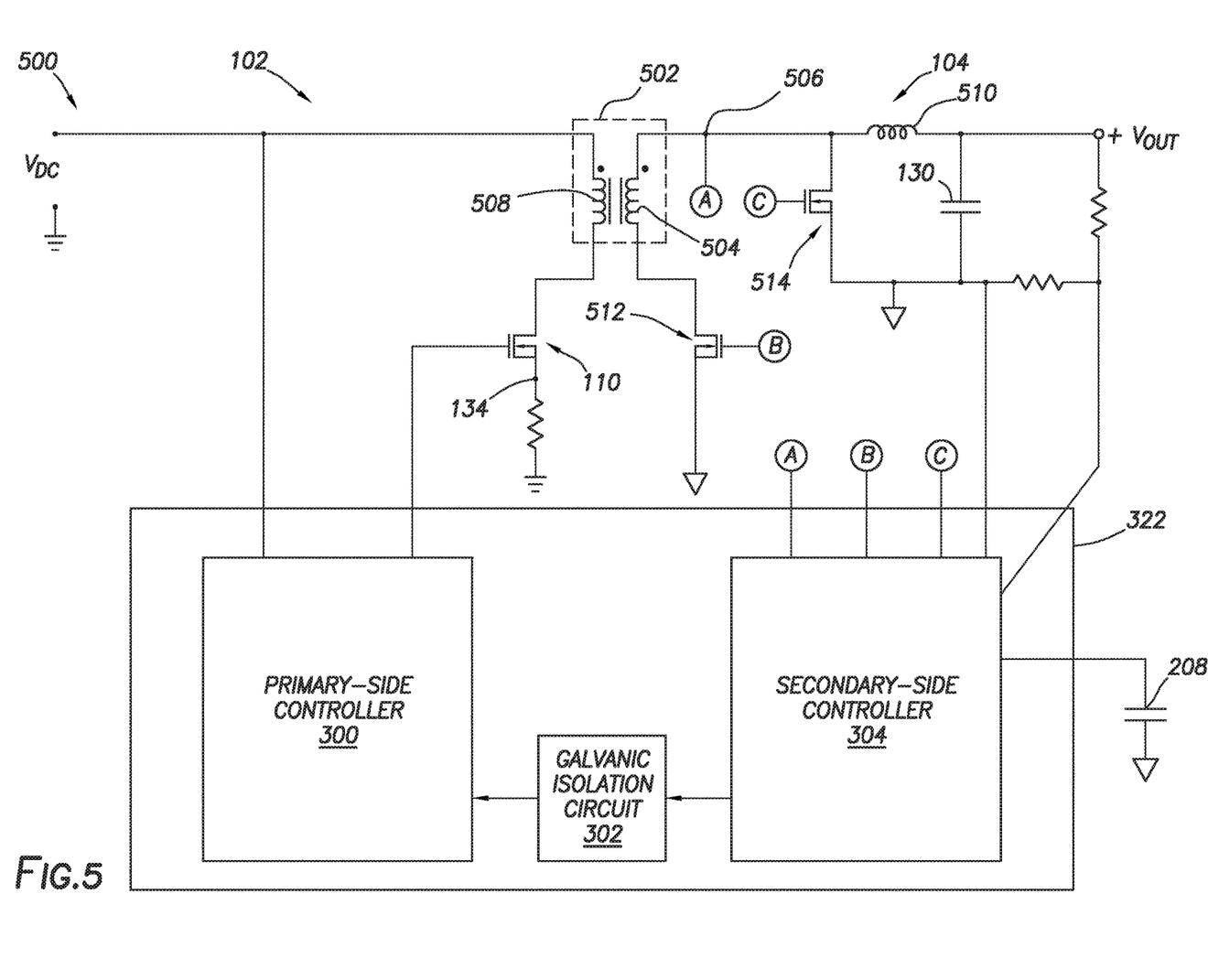
FIG. 5 shows a circuit diagram of a power converter in accordance with at least some embodiments.

While the various example embodiments shown and discussed to this point are in reference to power converter 100 arranged for flyback operation, modeling or emulating the primary current on the secondary side 104 may take place in other topologies. FIG. 5 shows a circuit diagram of a power converter 500 in accordance with at least some embodiments. In particular, FIG. 5 shows a power converter 500 arranged for forward operation. In forward operation, the main transformer 502 is designed and constructed such that the polarity of the voltage on the secondary winding 504 as caused by current in the primary winding 508 (as shown by the dot convention in the figure) is opposite that of the main transformer 106 (FIG. 1). The primary side 102 is similar to the setup for flyback operation. On secondary side 104 an inductor 510 resides between a first lead of the secondary winding 504 and the $V_{OUT}$. An isolation FET 512 resides between a second lead of the secondary winding 504 and the common on the secondary side 104, and the gate of the isolation FET couples to the secondary controller 304. A grounding FET 514 selectively couples the inductor 510 to common on the secondary side 104, and the gate of the grounding FET couples to the secondary-side controller 304. The example secondary side 104 further comprises a voltage divider between the $V_{OUT}$ and common, and the secondary-side controller 304 couples across one of the resistors (in the figure, the lower sense resistor) such that voltage drop across the sense resistor can be measured. In spite of the slight differences, in the example embodiments of FIG. 5 the secondary-side controller 304 emulates primary current by creating a signal indicative of primary current (e.g., during periods of time when the main FET 110 is conducting). More particularly, the secondary-side controller 304 may charge an external capacitor 208.

For the example power converter arranged for forward operation, the voltage at the current sense node 134 is given by Equation (1) above. On the secondary side 104, when the main FET 110 is conductive and the isolation FET 512 is simultaneously conducting, the voltage at the node 506 between the secondary winding 504 and the and the inductor 510 simplifies to:

$$V_S = \frac{V_{DC}}{N} \qquad (8)$$

Rather than using a differential amplifier 200 (FIG. 2), power converters arranged for forward conduction may use a single input amplifier (or the second input may be grounded), and thus the $I_{RAMP}$ current may be as follows:

$$I_{RAMP} = V_S \cdot G \qquad (9)$$

Substituting $V_S$ from equation (8) into equation (9) yields:

$$I_{RAMP} = \frac{V_{DC}}{N} \cdot G. \qquad (10)$$

Again assuming the voltage on capacitor 208 starts at zero for each cycle (such is caused by switch 210 at least momentarily closing), the voltage on the capacitor may be shown by the following equation:

$$V_C = \frac{I_{RAMP} \cdot T_{ON}}{C}, \qquad (11)$$

as before. Substituting $I_{RAMP}$ from equation (10) into equation (11) yields:

$$V_C = \frac{V_{DC} \cdot G \cdot T_{ON}}{N \cdot C}. \qquad (12)$$

Again, if the voltage on the capacitor C 208 is selected to emulate the voltage $V_{CS}$ at the node 134 (i.e. $V_S$ equals $V_{CS}$), then setting equation (1) equal to equation (12) and solving for C again yields:

$$C = \frac{L \cdot G}{N \cdot R_{cs}}. \qquad (13)$$

In other words, even for a power converter arranged for forward operation a capacitance can be selected to emulate the magnetizing inductance, and the selection of capacitance is independent of the source voltage $V_{DC}$, the output voltage $V_{OUT}$, and the on time $T_{ON}$.

As before, the secondary-side controller 304 in the example power converter 500 creates a primary PWM signal supplied to the primary-side controller 300 by way of the isolation circuit 302. Thus, the descriptions above with respect to a power converter arranged for flyback operation are equally valid, with the exception of the timing of making the isolation FET 512 and grounding FET 514 conductive. The isolation FET 512 is made conductive contemporaneously with the primary FET 110, and grounding FET 514 is made conductive opposite the isolation FET 512, as would be understood by one of ordinary skill in the art with the benefit of this disclosure.

Further still, generating the primary PWM signal on the secondary side, yet still using peak current control of the primary winding (e.g., by emulating the current on the secondary side) may take place in other topologies such as full bridge and half bridge topologies driving a main transformer. Moreover, while the discussion has also assumed synchronous rectification on the secondary side, a secondary-side controller may also be placed and used on the secondary side even when the rectifier on the secondary side is merely a diode.

Returning to FIG. 3, the various example embodiments discussed to this point have assumed that the primary-side controller 300, the galvanic isolation circuit 302, and the secondary-side controller 304 are separate and distinct circuits, and possibly even separately packaged. However, in other example embodiments the controllers 300 and 304, along with the galvanic isolation circuit 302, may be combined and packaged in any convenient form. For example, FIG. 3 shows the various controllers and circuits combined into a packaged circuit 322. More particularly, the example packaged circuit 322 comprises the secondary-side controller 304 (in some cases on its own substrate (e.g., dashed line of FIG. 4)), the primary-side controller 300 (in some cases on a separate and distinct substrate from the secondary-side controller 304), and the galvanic isolation circuit 302 (again possibly on its own substrate) packaged together in the packaged circuit 322. In cases where the primary-side controller 300 and secondary-side controller 304 are packaged together, the various terminals of the secondary-side controller previously discussed (e.g., gate terminal 306, voltage sense terminal 308, output voltage terminal 310, and external capacitor terminal 314) are terminals of the overall packaged device 322. Similarly, some of the inputs to the primary-side controller 300 also become terminals of the packaged circuit 322 (e.g., gate output 318 becomes a gate output terminal, and voltage sense input 320 becomes a voltage sense terminal). As before, additional terminals would also be present but are not included so as not to further complicate the drawing.

If a packaged circuit 322 is used in place of separate and distinct components, the inputs and terminals coupled to the galvanic isolation circuit need not necessarily be externally accessible terminals of the packaged circuit 322. For example, the pulse input 316 need not necessarily be externally accessible if the galvanic isolation circuit 302 is packaged with the packaged circuit 322. Similarly, the primary PWM signal (driven to the primary PWM signal terminal for stand alone secondary-side controllers) need to not be externally accessible if the galvanic isolation circuit 302 is packaged with the packaged circuit 322. In the case of the galvanic isolation circuit 302 co-packaged with the controllers 300 and 304, likely the galvanic isolation circuit 302 takes the form of an isolator built on silicon using either inductive or capacitive coupling, or an optocoupler embedded in the packaging. In yet still other cases, the packaged circuit 322 may exclude the galvanic isolation circuit 302, and instead having terminal connections for implementing the galvanic isolation outside the packaged circuit 322 (e.g., by way of a communication transformer or optocoupler disposed outside the packaging of the packaged circuit 322.

Other variants regarding packaging are also contemplated. For example, the primary-side controller 300 and the galvanic isolation circuit 302 could be co-packaged and used with a separate, distinct, and individually packaged secondary-side controller 304. Moreover, the primary-side controller 300 may be individually packaged, and the galvanic isolation circuit 302 could be co-packaged secondary-side controller 304.

Figure 6:
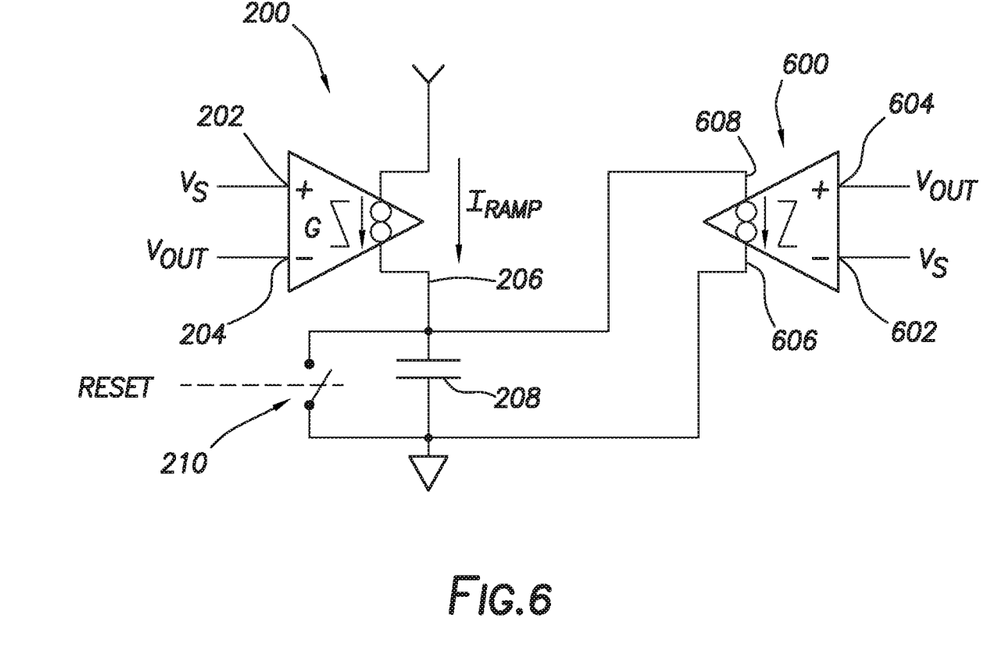
FIG. 6 shows a block diagram of an emulation controller in accordance with at least some embodiments.

The various embodiments arranged for flyback operation discussed to this point have implicitly assumed that the primary winding 108 is operated in a mode where the current reaches zero before the next charge cycle (e.g., CrM or DCM mode). In FIG. 2, the implicit assumption manifests itself as switch 210 that closes each cycle to drain the current stored on the capacitor prior to each emulation. However, in yet still further embodiments, the secondary-side controller 304, and particularly the emulation controller 408, may be implemented in switching power supplies operating in continuous current mode (CCM) where the current through primary winding 108 rises and falls, but does not reach zero in normal operation. FIG. 6 shows an emulation controller in accordance with at least some embodiments that may operate in CCM systems. In particular, FIG. 6 shows components of the emulation controller of FIG. 2 (e.g., amplifier 200, non-inverting input 202, inverting input 204, current output 206, capacitor 208, and switch 210) all coupled similarly to FIG. 2. The example emulation controller of FIG. 6 further comprises another transconductance amplifier 600 (hereafter just "amplifier 600") that defines an inverting input 602, a non-inverting input 604, a current output 606, and a current input 608. The inverting input 602 couples to $V_S$, and the non-inverting input 604 couples to $V_{OUT}$. The current output 606 is coupled to common on the secondary side, and the current input 608 is coupled to the capacitor 208.

Operation of the amplifier 200 of the emulation controller of FIG. 6 is similar to that of FIG. 2. During periods of time when the main FET 110 (FIG. 3) is conducting, the emulation controller creates a (rising) voltage on the capacitor 208 that emulates the voltage at the current sense node 134 (FIG. 3). However, once the peak current is reached and the main FET 110 is made non-conductive, rather than reset the circuit by closing switch 210, the emulation of the voltage at the current sense node 134 continues by ramping down the voltage by way of amplifier 600 proportional the difference between $V_S$ and $V_{OUT}$. Once the signal indicative of primary current (here, the voltage on capacitor 208) reaches a downward going predetermined non-zero value, the secondary-side controller 304 commands the primary-side controller 300 to make the main FET 110 conductive again, and the cycle of emulation continues. The switch 210 may only be closed in full-reset situations, such as at initial startup.

Figure 7:
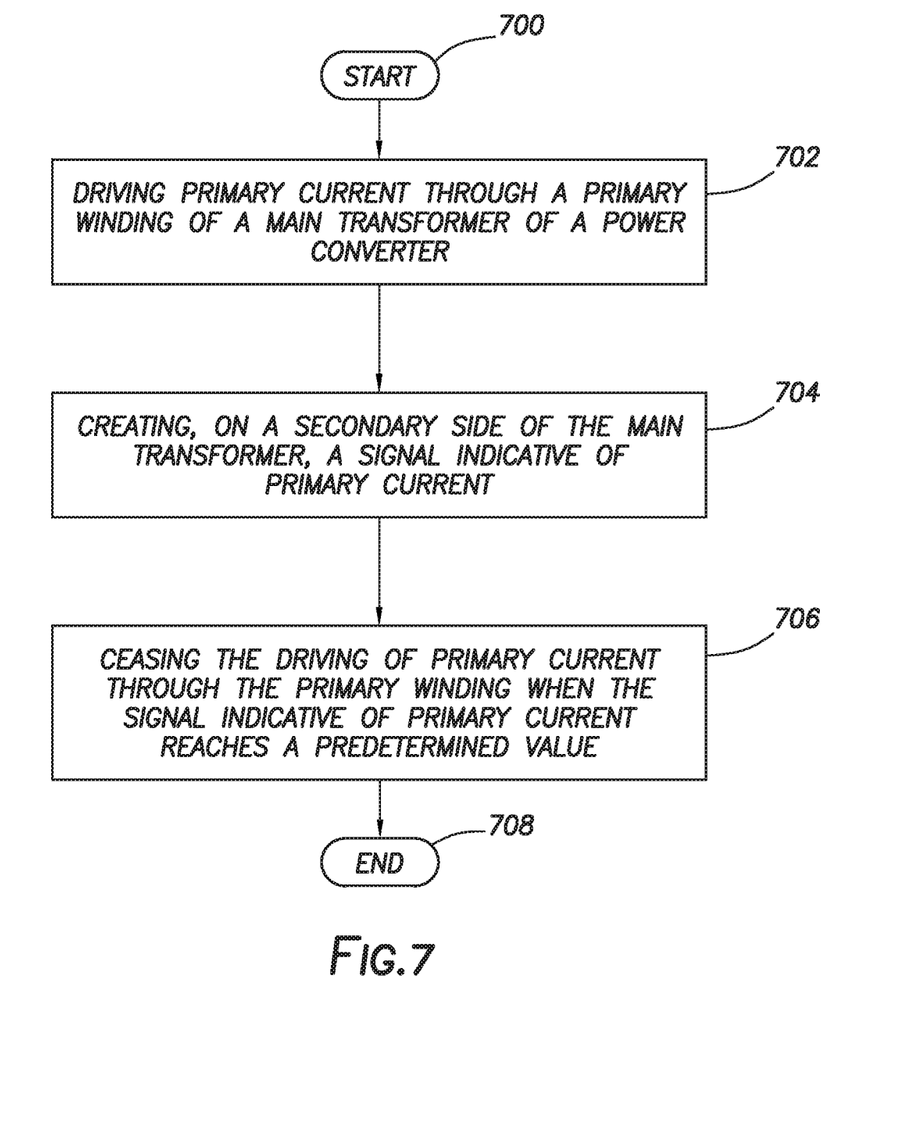
FIG. 7 shows a method in accordance with a least some embodiments.

FIG. 7 shows a method in accordance with a least some embodiments. In particular, the methods starts (block 700) and comprises: driving primary current through a primary winding of a main transformer of a power converter (block 702); creating, on a secondary side of the main transformer, a signal indicative of primary current (block 704); ceasing the driving of primary current through the primary winding when the signal indicative of primary current reaches a predetermined value (block 706). Thereafter the method ends (block 708).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   driving primary current through a primary winding of a main transformer of a power converter;
   ceasing the driving of primary current through the primary winding when a signal proportional to primary current reaches a predetermined value;
   creating, on a secondary side of the main transformer, the signal proportional to primary current, the creating by:
     sensing a voltage at a cathode of a rectifier on the secondary side, the sensing the voltage at the cathode during the driving of primary current; and
     charging a capacitor responsive to the voltage at the cathode, a voltage on the capacitor being the signal indicative of primary current.

2. The method of claim 1 wherein driving the primary current further comprises:
   sending, from the secondary side to a primary side, an asserted control signal; and
   making a main switch on the primary side conductive responsive to the asserted control signal.

3. The method of claim 2 wherein ceasing the driving of the primary current further comprises:
   sending, from the secondary side to the primary side, a de-asserted control signal; and
   making the main switch on the primary side non-conductive responsive to the de-asserted control signal.

4. The method of claim 2 wherein sending the asserted control signal further comprises sending through a system that provides galvanic isolation between the primary side and the secondary side.

5. The method of claim 4 wherein sending through the system that provides galvanic isolation further comprises at least one selected from the group comprising: sending through a gate-drive transformer distinct from the main transformer; sending through an optocoupler; and sending through the main transformer.

6. The method of claim 1 wherein creating the signal proportional to primary current further comprises:
   sensing an output voltage of the power converter;
   wherein charging the capacitor further comprises charging the capacitor responsive to a voltage difference between the voltage at the cathode and the output voltage.

7. The method of claim 1 wherein driving the primary current further comprises driving the primary current through the primary winding of the power converter arranged for flyback operation.

8. The method of claim 1 wherein driving the primary current further comprises driving the primary current through the primary winding of the power converter arranged forward operation.

9. A circuit for control of a switching power converter comprising:
   a gate terminal, a winding sense terminal, an output voltage terminal, a primary pulse-width modulation (PWM) terminal, and an external capacitor terminal;
   a first substrate;
   a PWM controller defined on the first substrate and electrically coupled to the output voltage terminal and the primary PWM terminal, the PWM controller configured to create a primary PWM signal driven to the primary PWM terminal;
   an emulation controller defined on the first substrate, the emulation controller electrically coupled to the winding sense terminal, the output voltage terminal, and the external capacitor terminal, the emulation controller configured to create a signal proportional to primary current by driving current to the external capacitor terminal; and
   wherein the PWM controller is further coupled to the signal proportional to primary current, and the PWM controller is configured to control a duty cycle of the primary PWM signal based on the signal proportional to primary current.

10. The circuit of claim 9:
    wherein the PWM controller is configured to assert the primary PWM signal to cause a main field effect transistor (FET) on a primary side of the switching power converter to become conductive;
    wherein the emulation controller creates the signal proportional to primary current responsive to assertion of the primary PWM signal;
    wherein the PWM controller is configured to de-assert the primary PWM signal when the signal proportional to primary current reaches a predetermined threshold.

11. The circuit of claim 10 wherein the emulation controller resets the signal proportional to primary current when the PWM controller de-asserts the primary PWM signal.

12. The circuit of claim 10 wherein the PWM controller sets the predetermined threshold responsive, at least in part, to voltage on the output voltage terminal.

13. The circuit of claim 9 wherein the emulation controller further comprises:
    an amplifier defining a first input and an amplifier output, the first input coupled to the winding sense terminal, and the amplifier output coupled to the external capacitor terminal; and
    an electrically controlled switch coupled between the external capacitor terminal and a ground, the electrically controlled switch having a control input coupled to the gate terminal.

14. The circuit of claim 9 further comprising:
    a second substrate distinct from the first substrate; and
    a primary-side controller defined on the second substrate, the primary-side controller configured to drive a gate output terminal responsive to the primary PWM signal from the PWM controller.

15. The circuit of claim 9 further comprising:
    a second substrate distinct from the first substrate;
    a primary-side controller defined on the second substrate, the primary-side controller configured to drive a gate output terminal responsive to the primary PWM signal from the PWM controller; and
    a galvanic isolation circuit disposed within a packaged circuit and communicatively coupled between the PWM controller and the primary-side controller.

16. A power converter comprising:
    a primary side comprising:
      a primary winding of a main transformer;

a primary field effect transistor (FET) coupled to the primary winding, the primary FET having a gate;

a primary-side controller defining a pulse input and a gate output, the gate output coupled to the gate of the FET, the primary-side controller configured to drive the gate output responsive to a PWM signal received on the pulse input;

a secondary side comprising:
a secondary winding of the main transformer;
a secondary FET defining a gate and a drain, the drain coupled to a first lead of the secondary winding;
a secondary-side controller defining a gate terminal, a winding sense terminal, an output voltage terminal, a primary pulse-width modulation (PWM) terminal, and a capacitor terminal, the gate terminal coupled to the gate of the secondary FET, the winding sense terminal coupled to the drain of the secondary FET;
a capacitor coupled between the capacitor terminal of the secondary-side controller and ground;

an isolation circuit that provides galvanic isolation, the isolation circuit coupled between the primary PWM terminal of the secondary-side controller and the pulse input of the primary-side controller;

wherein the secondary-side controller is configured to, during each switching cycle of the primary FET:
command the primary-side controller to make the primary FET conductive to induce a primary current through the primary winding, the command by way of the primary PWM terminal through the isolation circuit;
create a signal proportional to primary current based on a voltage at the drain of the secondary FET; and
command the primary-side controller to make the primary FET non-conductive when the signal proportional to primary current reaches a predetermined value, the command by way of the primary PWM terminal through the isolation circuit.

17. The power converter of claim 16 wherein the secondary-side controller further comprises:
a substrate;
a PWM controller defined on the substrate and electrically coupled to the output voltage terminal and the primary PWM terminal, the PWM controller configured to create a primary PWM signal driven to the primary PWM terminal;
an emulation controller defined on the substrate, the emulation controller electrically coupled to the winding sense terminal, the output voltage terminal, and the capacitor terminal, the emulation controller configured to create the signal proportional to primary current by driving current to the capacitor terminal; and
wherein the PWM controller is further coupled to the signal proportional to primary current, and the PWM controller is configured to control duty cycle of the primary PWM signal based on the signal proportional to primary current.

18. The power converter of claim 16 wherein the secondary winding and the secondary FET are arranged for flyback operation.

19. The power converter of claim 16 wherein the secondary winding and the secondary FET are arranged for forward operation.

20. The power converter of claim 19 wherein the primary winding and primary FET are arranged for at least one selected from the group comprising: half-bridge topology; and full-bridge topology.

21. The power converter of claim 16 wherein the isolation circuit is at least one selected from the group comprising: a communication transformer distinct from the main transformer; and an optocoupler.

22. A method comprising:
driving primary current through a primary winding of a main transformer of a power converter;
ceasing the driving of primary current through the primary winding when a signal indicative of primary current reaches a predetermined value;
creating, on a secondary side of the main transformer, the signal indicative of primary current, the creating by:
sensing an output voltage of the power converter;
sensing a voltage at a node between a secondary winding of the main transformer and a rectifier on the secondary side;
charging a capacitor responsive to a first voltage difference between the voltage at the node and the output voltage, a voltage on the capacitor being the signal indicative of primary current; and then
discharging the capacitor responsive to a second voltage difference between the voltage at the node and the output voltage, the voltage on the capacitor being the signal indicative of primary current.

23. A circuit for control of a switching power converter comprising:
a gate terminal, a winding sense terminal, an output voltage terminal, a primary pulse-width modulation (PWM) terminal, and an external capacitor terminal;
a first substrate;
a PWM controller defined on the first substrate and electrically coupled to the output voltage terminal and the primary PWM terminal, the PWM controller configured to create a primary PWM signal driven to the primary PWM terminal;
an emulation controller defined on the first substrate, the emulation controller electrically coupled to the winding sense terminal, the output voltage terminal, and the external capacitor terminal, the emulation controller configured to create a signal indicative of primary current by driving current to the external capacitor terminal; and
wherein the PWM controller is further coupled to the signal indicative of primary current, and the PWM controller is configured to control duty cycle of the primary PWM signal based on the signal indicative of primary current;
wherein the emulation controller further comprises:
a differential amplifier defining a first differential input, a second differential input, and an amplifier output, the first differential input coupled to the winding sense terminal, the second differential input coupled to the output voltage terminal, and the amplifier output coupled to the external capacitor terminal; and
an electrically controlled switch coupled between the external capacitor terminal and ground, the electrically controlled switch having a control input coupled to the gate terminal.

* * * * *